(12) United States Patent
Messier

(10) Patent No.: US 7,327,816 B2
(45) Date of Patent: Feb. 5, 2008

(54) HIGH RESOLUTION SYNTHESIZER WITH IMPROVED SIGNAL PURITY

(75) Inventor: Jason Messier, Boston, MA (US)

(73) Assignee: Teradyne Inc., Boston, MA (US)

( * ) Notice: Subject to any disclaimer, the term of this patent is extended or adjusted under 35 U.S.C. 154(b) by 711 days.

(21) Appl. No.: 10/744,037

(22) Filed: Dec. 23, 2003

(65) Prior Publication Data
US 2005/0135524 A1 Jun. 23, 2005

(51) Int. Cl.
H04L 7/00 (2006.01)
(52) U.S. Cl. .................................. 375/354
(58) Field of Classification Search ............ 375/354
See application file for complete search history.

(56) References Cited

U.S. PATENT DOCUMENTS

| | | | | |
|---|---|---|---|---|
| 4,283,768 A | | 8/1981 | Scott | |
| 4,454,486 A | * | 6/1984 | Hassun et al. | 332/117 |
| 4,958,310 A | * | 9/1990 | Goldberg | 708/270 |
| 5,028,887 A | * | 7/1991 | Gilmore | 331/18 |
| 5,467,294 A | * | 11/1995 | Hu et al. | 708/276 |
| 5,517,532 A | * | 5/1996 | Reymond | 375/354 |
| 5,528,308 A | * | 6/1996 | Alelyunas et al. | 348/512 |
| 6,246,726 B1 | * | 6/2001 | Garcia et al. | 375/295 |
| 6,493,131 B1 | * | 12/2002 | Tarng et al. | 359/326 |
| 6,584,162 B1 | * | 6/2003 | Tinker | 375/355 |
| 6,642,754 B1 | * | 11/2003 | Dobramysl et al. | 327/105 |
| 6,993,087 B2 | * | 1/2006 | Rosnell et al. | 375/295 |
| 7,092,476 B1 | * | 8/2006 | Melanson | 375/376 |
| 7,130,327 B2 | * | 10/2006 | Robinson et al. | 375/132 |
| 2002/0075976 A1 | * | 6/2002 | Richards et al. | 375/354 |
| 2003/0142737 A1 | * | 7/2003 | Tarng | 375/225 |
| 2005/0002481 A1 | * | 1/2005 | Woo et al. | 375/354 |

FOREIGN PATENT DOCUMENTS

| | | |
|---|---|---|
| EP | 0 528 565 | 2/1993 |
| EP | 0 528 565 A2 | 2/1993 |
| EP | 1353189 A2 | 10/2003 |
| WO | WO 9107828 A1 | 5/1991 |

OTHER PUBLICATIONS

International Search Report, Mailing Date Apr. 22, 2005.
Communication dated Jun. 14, 2006 from European Patent Application 04 030 701.9.
Joseph Tierney et al.; "A Digital Frequency Synthesizer", *IEEE Transaction on Audio and Electroacquistics*; vol. 19, No. 1, Mar. 1971, pp. 48-57.

(Continued)

*Primary Examiner*—David C. Payne
*Assistant Examiner*—Leon-Viet Q Nguyen
(74) *Attorney, Agent, or Firm*—Wolf, Greenfield & Sacks, P.C.

(57) ABSTRACT

An automatic test system using a DDS signal generator to create a signal with high spectral purity or a low jitter digital clock. The low jitter clock has variable frequency and is programmed to control other test functions, such as the generation of arbitrary waveforms. The DDS uses a high resolution, high sampling rate DAC to generate a sine wave that is converted to a digital clock. The architecture of the DDS signal generator allows low cost CMOS circuitry to be used to generate the data stream that feeds the high sample rate DAC.

26 Claims, 4 Drawing Sheets

OTHER PUBLICATIONS

Bryan J. Dinteman, "Phase Coherent, Event Synchronized Test System Architecture", *IEEE*, 1993, pp. 812-819.

Communication dated Jun. 15, 2007 from European Patent Application 04 030 701.9.

Zhang Zhongting, "The Design of the General Function Generator Module based on VXI bus" IMTC 94, 1994, pp. 67-69.

M. Kumagai et al., "A Spectrum Analyzer using a High Speed Hopping Synthesizer," IMTC 94, 1994; p. 523-525.

S. Twelves et al., "Investigation into the effects of quantization noise on a digital FM modulator," Tencon '96, Proceedings 1996 IEEE Tencon, Digital Signal Processing Applications Perth, 1996, pp. 317-322.

Communication from foreign counterpart Application No. EP4030701.0, 5 pages, Jan. 23, 2007.

* cited by examiner

HIGH RESOLUTION SYNTHESIZER WITH IMPROVED SIGNAL PURITY

This invention relates generally to signal generation and more specifically to generation of periodic signals with high purity.

BACKGROUND OF INVENTION

Direct Digital Synthesis ("DDS") is a technique used to generate periodic signals where control over one or more signal properties is desired. Analog signals can be generated with the period and the wave shape controlled through DDS.

FIG. 1 shows a traditional DDS architecture with (DDS) 100 being used to generate a sine wave that is then converted to a two-valued clock. The DDS 100 receives an accumulator clock $CLK_{ACC}$ and a digital input signal $\Phi_{Inc}$ indicating a phase increment. The DDS outputs an analog signal $F_{OUT}$. The frequency of $F_{OUT}$ can be set by varying the frequency of $CLK_{ACC}$ and/or varying the phase increment $\Phi_{Inc}$.

In operation, accumulator 110 produces a new output value $\Phi_{Acc}$ on each cycle of clock $CLK_{ACC}$. To produce each new value, the accumulator 110 adds $\Phi_{Inc}$ to its current contents. FIG. 2 shows a block diagram of an accumulator, such as is known in the art.

The value in accumulator 110 serves as a control input to Sine Unit 112. Sine Unit 112 converts each phase value $\Phi_{Acc}$ into a corresponding amplitude value. In the illustration, the DDS signal generator is producing a sine wave. Accordingly, the amplitudes are related to the value $\Phi_{Acc}$ by the function $\sin(\Phi_{Acc})$. Sine Unit 112 might generate the required outputs using a math engine—a circuit configured to produce an output signal having a specific mathematical relationship to an input signal. Alternatively, it is possible to implement a sine unit by pre-computing the required output value for each value of the control input. These pre-computed output values are then stored in a memory at locations addressed by the control input. In operation, the control inputs are applied as addresses to the memory, resulting in the required output value of $\sin(\Phi_{Acc})$ being read from the memory for each of $\Phi_{Acc}$ applied as an input. Such a look-up table is shown in FIG. 3.

The output of sine unit 112 is periodic. Periodicity is achieved because of overflow in accumulator 110. The value stored in accumulator 110 increases (or decrease if negative values of $\Phi_{Inc}$ are used) for every cycle of $CLK_{ACC}$. Eventually, the value in accumulator 110 overflows (or underflows—if negative values of $\Phi_{Inc}$ are used). The full scale value of the accumulator is selected to correspond to a phase of 2pi radians. If the addition of $\Phi_{Inc}$ would cause the value of $\Phi_{Acc}$ to exceed 2pi radians by an amount x, after the overflow, the accumulator stores only the value x. As a result, an overflow of the accumulator has the same effect as starting a new cycle of the periodic waveform, with the appropriate phase relationship maintained between the end of one cycle and the beginning of the next cycle.

The duration of one cycle of the waveform $F_{out}$ can be controlled by altering the time it takes for accumulator 110 to overflow. This time can be controlled by changing the frequency of clock $CLK_{ACC}$. This time can also be controlled by changing the value of $\Phi_{Inc}$.

Digital values representing $\sin(\Phi_{Acc})$ are then fed to a digital to analog converter, such as DAC 114 which converts them to a quantized analog signal. Usually, a filter is attached to the output of the digital to analog converter to smooth out the quantized signal. Where a sine wave is required, the filter is likely a bandpass filter because a bandpass filter that includes the desired frequency of the sine wave in its pass band will increase the "spectral purity" of the signal.

If a digital signal, such as a clock, is desired, the analog signal may be fed to a comparator 118 to square off the signal. Thus, the DDS signal generator provides a convenient mechanism to generate a clock of controlled frequency. Where the DDS signal generator is being used to generate a clock, spectral purity is also important. Lack of spectral purity in the signal $F_{out}$ appears as "jitter" in the digital clock. For precise measurement applications requiring a clock, low jitter is important. Therefore, it would be highly desirable to provide a DDS signal generator with high spectral purity.

One application where a variable frequency, but low jitter, clock is desirable is in automatic test equipment. FIG. 8 shows in greatly simplified form a block diagram of an automatic test system 800 of the type that might be used to test semiconductor chips. An example of such a system is the Tiger™ test system sold by Teradyne, Inc. of Boston, Mass., USA.

The test system includes a work station 810 that controls the test system 800. Work station 810 runs test programs that set up the hardware within tester body 812 and reads back results of tests. The work station also provides an interface to a human operator so that the operator can provide commands or data for testing a particular type of semiconductor device. For example a program running on work station 810 might change the frequency of a clock within the test system by changing the value of a register inside tester body 812 holding the value of $\Phi_{Inc}$.

To fully test many types of devices, both analog and digital test signals must be generated and measured. Inside tester body 812 are digital "pins" 820 and analog instruments 818. Both are connected to the device under test 850. Digital pins are circuits that generate or measure digital signals or DC voltages and currents. In contrast, analog instruments generate and measure analog signals.

Pattern generator 816 provides control inputs to the digital pins 820 and the analog instruments 818. These control inputs define both the values and the time at which test signals should be generated or measured. To ensure an accurate test, the actions of the digital pins and the analog instruments often must be synchronized. Timing generator 814 provides timing signals that synchronize operation of the various components within tester body 812.

Automatic test equipment is made programmable so that it can test many different types of devices. It is often desirable to be able within automatic test equipment to generate a digital clock of a programmable frequency that has very low jitter. An example of such an application is called an arbitrary waveform generator (AWG). AWG 822 creates a waveform that can be programmed into an almost arbitrary shape using a clock of controllable frequency. In the prior art, a DDS signal generator 100 has been used as the clock for the AWG. The generated waveform would be more accurate if the clock provided to AWG had less jitter.

Automatic test equipment also sometimes contains an analog instrument called a digitizer. Digitizer 823 also relies on a clock, which should preferably be programmable. Digitizer 823 could also be made more accurate if it were provided with a clock with lower jitter.

More generally, there are many applications where sine waves of high spectral purity are desirable for testing devices such as semiconductor chips. It would therefore be desirable to provide automatic test equipment with an improved synthesizer circuit to generate signals with improved spectral purity.

We have recognized that the DAC strongly influences the overall spectral purity of signals produced by a DDS. We have also recognized that spectral purity strongly depends on the sampling rate at which the DAC operates. In particular, impurities arising from signal-to-noise ratio (SNR) and spurious-free dynamic range (SFDR) decrease approximately linearly with DAC sampling rate. We have recognized the benefits of operating the DAC of a DDS at its highest possible sampling rate. However, as DACs with faster sampling rates become available, there are limitations on the availability of circuitry that can generate the data stream into the DAC. The circuitry needed to operate a DDS signal generator for high spectral purity is generally not available or undesirably expensive, consumes too much power, takes up too much space or is otherwise undesirable.

SUMMARY OF INVENTION

With the foregoing background in mind, it is an object to provide an improved DDS signal generator.

The forgoing and other objects are achieved in a DDS signal generator with a high sampling rate DAC fed by a circuit that interleaves a plurality of data streams. In the preferred embodiment, the data streams are generated by relatively inexpensive circuitry. In one aspect, the DDS signal generator generates a sine wave. In the preferred embodiment, this sine wave is used to create a low-jitter digital clock.

In another aspect, the DDS signal is used to generate a low-jitter digital clock of variable frequency. That clock is used within an automatic test system to clock an arbitrary waveform generator.

BRIEF DESCRIPTION OF DRAWINGS

The foregoing and other objects will be better appreciated by reference to the following detailed description and accompanying drawings in which.

DETAILED DESCRIPTION

Figure 1:
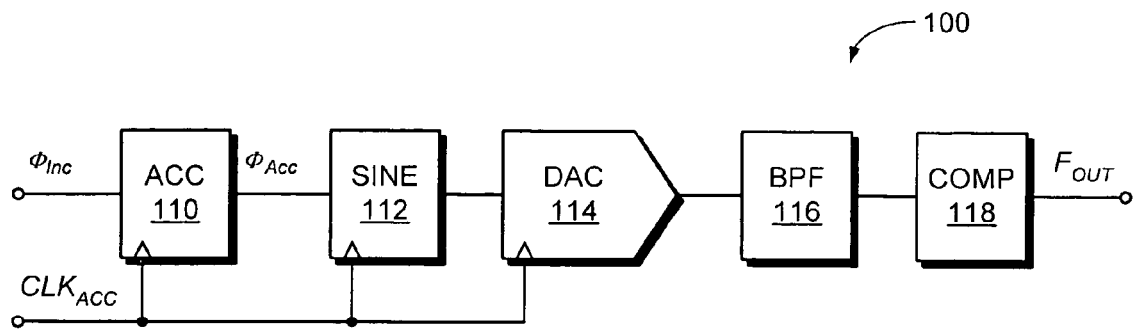
FIG. 1 is a block diagram of a prior art DDS signal generator used to generate a digital clock.
Figure 2:
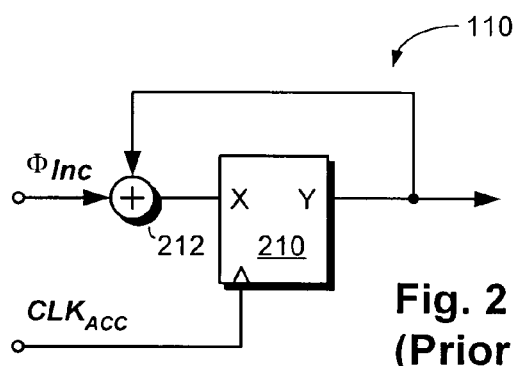
FIG. 2 is a block diagram of a prior art accumulator.
Figure 3:
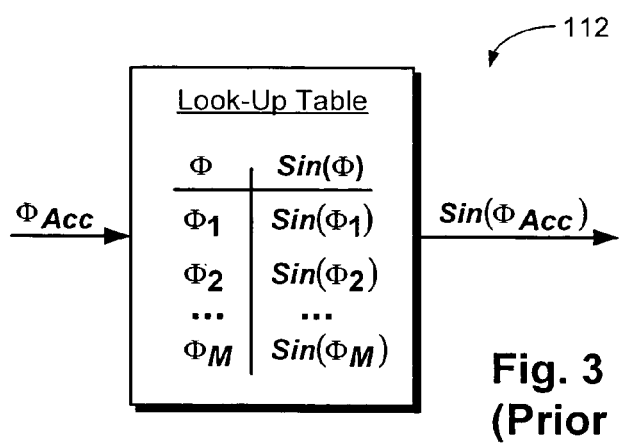
FIG. 3 is a block diagram of a prior art lookup table.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 4:
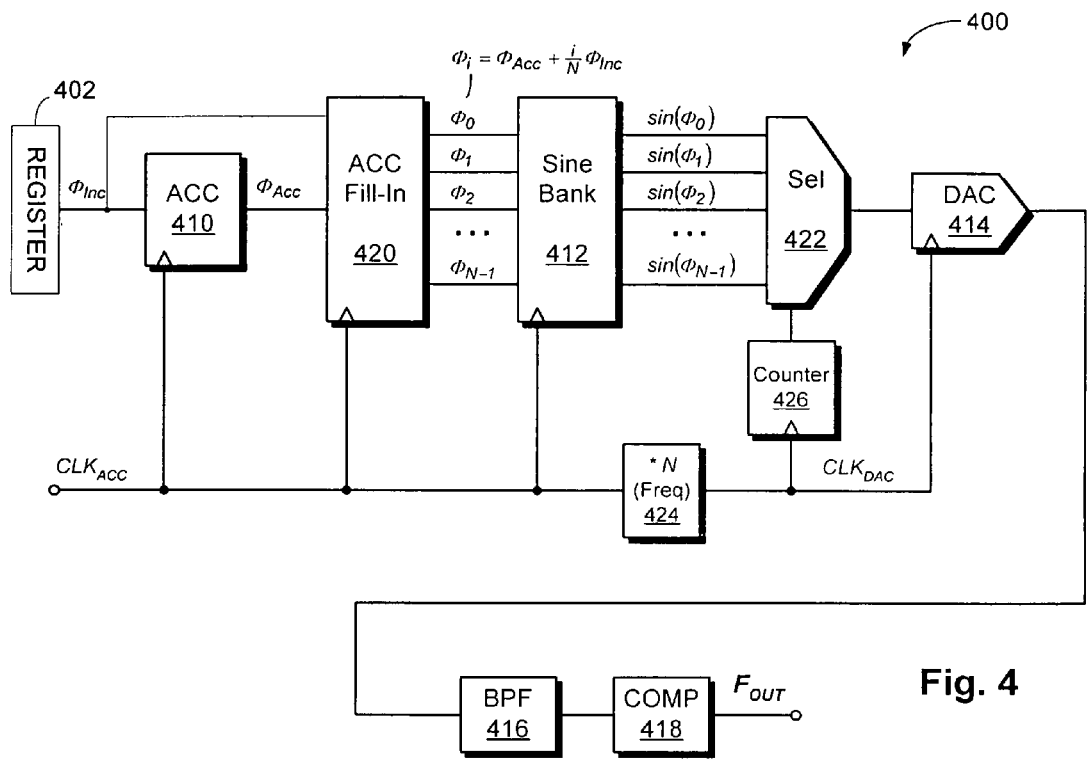
FIG. 4 is a block diagram of a DDS signal generator used to generate a digital clock.

FIG. 4 shows a synthesizer 400 used to generate a low jitter digital clock. Synthesizer 400 uses a modified form of direct digital synthesis.

As in the prior art, synthesizer 400 is clocked by a clock $CLK_{ACC}$. Register 402 stores a value of $\Phi_{Inc}$. For each cycle of clock $CLK_{ACC}$, the value stored in accumulator 410 increases by the value of $\Phi_{Inc}$ stored in register 402.

The value in accumulator 410 is fed to accumulator fill-in unit 420. Accumulator fill-in unit is shown in more detail in FIG. 5. For each new value of $\Phi_{Acc}$, accumulator fill-in unit 420 produces N new phase values, $\Phi_0 \ldots \Phi_{N-1}$. These N phase values represent values between the value in accumulator 410 and the value that will be in the accumulator 410 when the accumulator is incremented the next time accumulator 410 is clocked by $CLK_{ACC}$.

Figure 5:
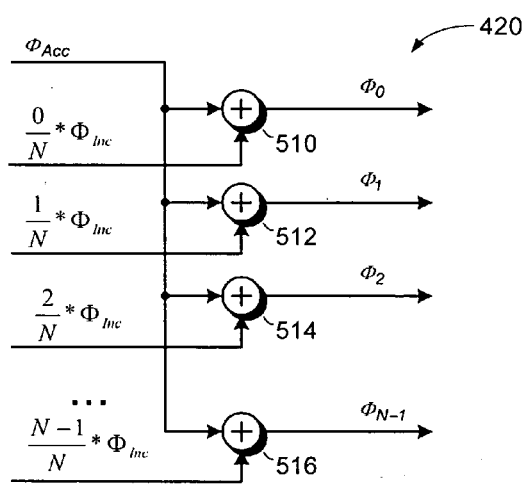
FIG. 5 is a block diagram of the fill-in unit used in the DDS signal generator of FIG. 4.

As shown in FIG. 5, the values of $\Phi_0 \ldots \Phi_{N-1}$ are formed by a bank of adders, of which 510, 512, 514 and 516 are shown. One of the inputs to each of the adders is the value stored in accumulator 410.

The second input to each of the adders is based on the value of the phase increment, $\Phi_{Inc}$, stored in register 402. A different fraction of the value of $\Phi_{Inc}$ is input to each of the adders. As shown in FIG. 5, the adders are ordered 0 . . . (N-1). The fraction of $\Phi_{Inc}$ input to each adder is based on the position of the adder in this order. The first adder receives $(0/N)*\Phi_{Inc}$. The next adder receives $(1/N)*\Phi_{Inc}$. The pattern continues in this fashion, with the final adder in the order receiving an input of $(N-1/N)*\Phi_{Inc}$.

Thus, for each cycle of $CLK_{ACC}$, accumulator fill-in unit outputs N linearly increasing phase values. The signals $\Phi_0 \ldots \Phi_{N-1}$ are provided to sine bank 412.

Sine bank 412 can be implemented as a bank of sine units 112. Each of the sine units in sine bank 412 receives one of the signals $\Phi_0 \ldots \Phi_{N-1}$ as a phase control input. Each of the sine units within sine bank 412 outputs a digital value representing a point on a sine wave. The specific point on the sine wave is controlled by the phase input applied to the specific sine unit.

The first control input $\Phi_0$ represents the control input to a sine unit as used in a prior art DDS circuit. Accordingly, the output of the first sine unit is a value of a sine wave as in the prior art DDS circuit. Each of the successive inputs $\Phi_1 \ldots \Phi_{N-1}$ represents a phase that is shifted relative to $\Phi_0$. Accordingly, the output of each successive sine unit within sine bank 412 represents the value of a sine wave shifted in time relative to the value produced by the preceding sine unit in the sine bank.

The outputs of each of the sine units within sine bank 412 is fed to one of the switchable inputs of selector 422. Selector 422, sometimes called a "multiplexer," connects one of the switchable inputs through to its output based on the value of a control input.

The control input of selector 422 is provided by counter 426. Preferably, counter 426 is a counter that counts at least from 0 to (N-1). Counter 426 either overflows to zero or is reset to zero for each cycle of $CLK_{ACC}$.

Counter 426 is clocked by frequency multiplier 424. Frequency multiplier receives an input from $CLK_{ACC}$. The output of frequency multiplier 424 is a higher frequency clock with a frequency that is N times the frequency of clock $CLK_{ACC}$. In this way, for each cycle of clock $CLK_{ACC}$, N successive values are clocked through selector 422.

Accumulator fill-in unit and sine bank 412 can be thought of as multiplying by N the number of samples of a sine wave available in each cycle of $CLK_{ACC}$. To allow the circuitry to operate at a relatively slow speed, these samples are generated in parallel. Frequency multiplier 424, counter 426 and selector 422 convert these parallel samples of a sine wave into a stream of digital values representing one sine wave. However, the sample rate of that stream of values is increased by a factor of N.

This stream of digital values is applied as the input to digital to analog (DAC) converter 414. DAC 414 is similar to DACs used in prior art DDS circuits. However, it needs to have a higher sampling rate to handle the higher data rate out of selector 422. By providing a data stream with a higher sampling rate to DAC, the output of DAC 414 has much greater spectral purity than signals generated by prior art DDS circuits.

The output of DAC 414 is shown in the embodiment of FIG. 4 to be presented to a band-pass filter 416. Such a filter can further increase spectral purity of the signal generated by DAC 414. However, bandpass filter 416 might not be used in all implementations.

The output of the bandpass filter 414 is provided to comparator 418. As in prior art synthesizers, a sine wave with high purity can be used to generate a digital clock with low jitter using a comparator as shown in FIG. 4.

Figure 6:
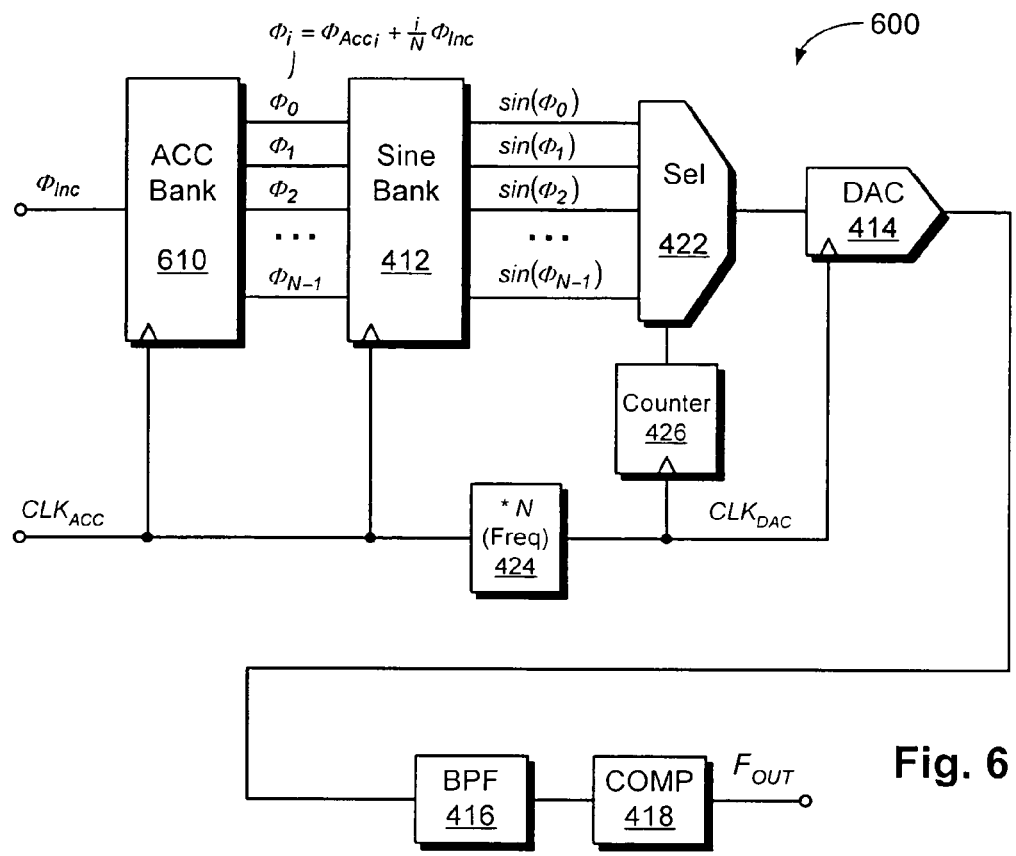
FIG. 6 is a block diagram of an alternative embodiment of a DDS signal generator used to generate a digital clock.

FIG. 6 shows an alternative embodiment in which a different circuit is used to generate phase values, $\Phi_0 \ldots \Phi_{N-1}$. Synthesizer 600 uses an accumulator bank 610 in place of accumulator 410 and accumulator fill-in unit 420.

Figure 7:
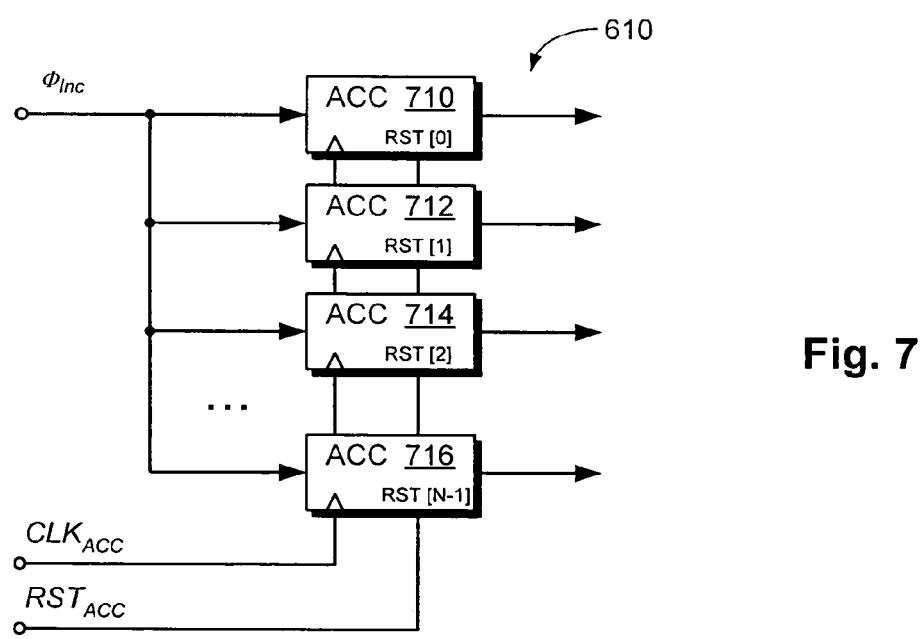
FIG. 7 is a block diagram of the accumulator bank used in the DDS signal generator of FIG. 6.
Figure 8:
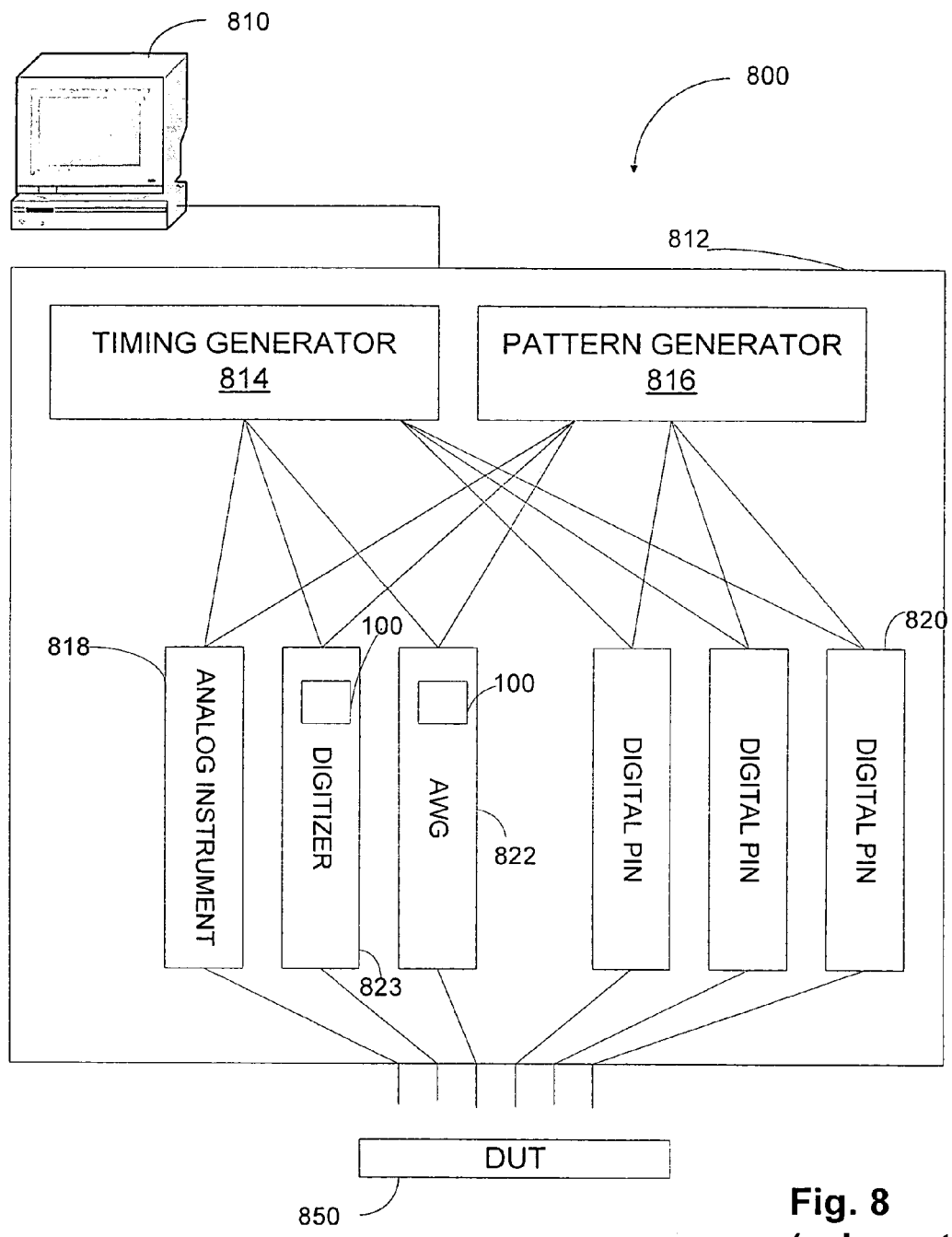
FIG. 8 is a block diagram of a prior art test system which can be improved through one of a DDS signal generator of FIG. 4 or FIG. 6.

As shown more fully in FIG. 7, accumulator bank 610 includes N accumulators, of which 710, 712, 714 and 716 are shown for simplicity. Each of the accumulators, such as 710, 712, 714 and 716 receives the value of $\Phi_{Inc}$ as an input. This value is added to the current value stored in the accumulator once for each cycle of $CLK_{ACC}$. To generate the signals $\Phi_0 \ldots \Phi_{N-1}$ representing values staggered in phase, each of the accumulators is initially set to values that are slightly different.

For example, accumulator 710 can initially be set to 0. Accumulator 712 can initially be set to $(1/N)*\Phi_{Inc}$. Accumulator 714 can initially be set to $(2/N)*\Phi_{Inc}$. This pattern continues in order, with accumulator 716 being initially set to $(N-1)/N*\Phi_{Inc}$.

FIG. 7 shows that each of the accumulators contains a reset line. Each time the accumulators are reset, the initial value should be loaded into the circuit. It should be appreciated that an accumulator having reset circuitry that computes and loads the appropriate initial value could be constructed. The circuitry could be part of each accumulator unit. Alternatively, in a system such as automatic test system 800, a computer controller, such as work station 810, might compute the required value and store it in the accumulator register before synthesizer 600 is enabled to operate. Set-up of electronic circuits before enabling them and loading values in accumulator registers are known functions of electronic circuits.

Various known techniques could be used to construct a synthesizer, such as synthesizer 400 or 600. To achieve high spectral purity, it is desirable that DAC 414 have both a high sample rate and relatively large number of bits. In a preferred embodiment, DAC 414 will receive at least 2 Giga-values ($2*10^9$) per second. More preferably, DAC 414 will receive 4 Giga-values per second. In a presently contemplated implementation, a 4.8 Giga-Hertz DAC is used.

Each digital value input to DAC 414 in a presently preferred embodiment has 10 bits. It is possible, as a way to reduce the effects of computational roundoff, that the circuits generating digital values applied to DAC 414 will generate values with more bits than DAC 414 uses in a conversion. For example, each value will preferably have at least 14 bits of resolution. In a presently contemplated implementation, the generated values have 18 bits of resolution.

Frequency divider 424, counter 426 and selector 422 have components that operate at the sampling rate of DAC 414. Accordingly, relatively high frequency components are needed to implement these components. Technologies to make circuit components operate at this speed are known. For example, circuits made using an ECL or SiGe processes can operate at the required speeds. In a preferred embodiment, these components will be implemented as a single ASIC or as part of an ASIC in automatic test 800 that is used for other functions. These features could, for example, be implemented as part of the same integrated circuit chip that holds DAC 414.

One advantage of the above described architecture is that the sine bank 412 and accumulator bank 610 or accumulator 410 and accumulator fill-in unit 420 do not need to operate at the same data rate as DAC 414. Thus, these components, and any other components clocked by $CLK_{ACC}$, can be implemented with relatively low speed circuitry. In a preferred embodiment, $CLK_{ACC}$ will operate at a frequency less than 500 MHz. In a presently preferred embodiment, $CLK_{ACC}$ will operate at a frequency less than 200 MHz. These clock rates correspond to a value of N that is at least 32. In a presently preferred embodiment, N is 64.

Many techniques are known to implement circuits operating at this range of frequencies. For example, CMOS is widely used to construct circuits operating in this range. A CMOS ASIC could be used for these components. However, because of the simplicity of the design, a relatively low-cost CMOS gate array could be used to implement these components. Moreover, the small size and relatively low power consumption of CMOS allows a synthesizer as described to be practically implemented in applications that are sensitive to size, power consumption and/or cost, such as automatic test equipment.

As described above, a synthesizer generates a signal with high spectral purity by creating a stream of digital values at a high rate. These values represent samples of a sine wave and serve as an input to the DAC. This stream of values is constructed by interleaving, for each period of the low frequency clock, the outputs of multiple sine units. The outputs of the sine units represent samples of sine waves, each having the same frequency as the sine wave in the interleaved data stream. However, the sampling rates of these sine waves is lower. Other implementations of a circuit that generates streams of digital values representing samples of sine waves and interleaving them would also be possible.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

For example, the invention is described in connection with a synthesizer that generates a sine wave that is then converted to a low jitter digital clock. The invention could be used to generate a sine wave that is used for other applications.

Also, the invention is illustrated as used in connection with automatic test equipment. However, the invention is applicable in any other area where sine waves of high spectral purity or digital clocks with low jitter are desired.

Furthermore, it should also be appreciated that DDS can be used to generate signals other than sine waves. Sine bank 412 could be replaced by a memory or math engine that implements a function other than a sine function.

FIG. 4 shows that each stage of synthesizer 400 is clocked, allowing for the circuit to be pipelined. It is not necessary that the circuit be pipelined.

Also, it was described above that the DDS circuit generates the multiple streams of digital values, each representing a sine wave offset by a uniform phase from sine waves represented by the other streams of digital values. These streams of data were achieved by supplying sine bank 410 with multiple phase inputs, each offset from the other by a uniform amount. The same effect could be achieved by supplying one control input to each sine unit in a sine bank, where each sine unit of the sine bank responded with a sine wave of a slightly different phase. For example, rather than receive N inputs representing N different phases, sine bank 412 might contain N memories that each stored values for a sine wave with a different phase.

As another example, it should be noted that the adders, sine units within the sine bank, and the inputs to the selector are "ordered." This ordering is a "logical" ordering in the sense that the ordering is used, for example, in determining which phase input to connect to which sine unit or which sine unit to connect through to the selector output. Such a logical ordering does not mean that any specific physical ordering is required when a chip containing the unit is constructed. Any convenient construction technique might be used. Also, the ordering may be established by any convenient system. For example, it is not necessary that the control input 0 to selector 422 switch the first value in the order to the output. Any numbering system or convention that preserves the desired ordering of signal may be used.

Also, counter 426 is shown to be clocked by a clock that is generated in a frequency multiplier. Any convenient method of generating two clocks with a known frequency relationship might be used. For example, a higher frequency clock might be generated to clock counter 426, with $CLK_{ACC}$ being generated in a frequency divider having the higher frequency clock as an input. Also, though preferable, it is not strictly necessary that the clocks be generated from the same clock.

Further, it was described that a sine unit could be implemented as either a look-up table or a math engine. It is also possible that a combination of look-up and computation could be used to generate the data streams that are provided by each sine unit. For example, a look-up table might have only $2^9$ locations, meaning that the memory is addressed by only 9 address lines. However, accumulator 410 might have more than 9 bits of resolution. In this case, the high order bits of the accumulator would be used to select a base value from one of the look-up tables. The low order bits of the accumulator could then be used to interpolate between the base value and the value at the next address in the memory. A simple linear interpolation might be used, though other more complicated forms of interpolation could be constructed.

Also, it was described that a DSS synthesizer is used to generate a sine wave of high spectral purity. The same circuitry could be used to generate a sine wave at a higher frequency than is possible with a traditional DDS circuit. In a traditional DDS circuit, the frequency of a generated sine wave is limited to ½ the frequency of $CLK_{ACC}$. In the described embodiment, the frequency of the generated sine wave is limited at N×½ the frequency of $CLK_{ACC}$.

What is claimed is:

1. A method of operating an automatic test system comprising at digital pin circuit and an analog instrument, the method comprising:
    a) generating with a timing circuit a first clock signal;
    b) with the digital pin circuit, generating or measuring a digital test signal at times referenced to the first clock signal; and
    c) with the analog instrument, generating or measuring an analog signal at times referenced to a digital clock signal of programmable frequency synchronized to the first clock signal, wherein generating the digital clock comprises:
        i) providing a plurality of streams of digital values, each value having a predetermined number of bits, and each stream representing samples of the periodic signal to be generated;
        ii) interleaving values derived from the plurality of streams to produce a final stream of digital values;
        iii) converting the final stream to an analog signal in a digital to analog converter having an input receiving digital values with less than the predetermined number of bits; and
        iv) producing the digital clock from the analog signal.

2. The method of claim 1 additionally comprising generating a plurality of phase signals, each having values with a period that is proportional to the period of the periodic signal, wherein each value in the plurality of streams of digital values is provided in response to one value of a phase signal of the plurality of phase signals.

3. The method of claim 2 additionally comprising generating each phase signal by repeatedly increasing each phase signal of the plurality of phase signals by a phase increment.

4. The method of claim 3 additionally comprising controlling the period of the periodic signal by changing the phase increment.

5. The method of claim 1, wherein converting the analog signal to a digital clock comprises processing the analog signal in a comparator to provide a square wave signal.

6. The method of claim 5 additionally comprising using the square wave signal as a clock to circuit generating a waveform.

7. The method of claim 1 wherein the final stream of digital values comprises in excess of 4 Giga-values per second.

8. The method of claim 7 wherein each of the plurality of streams of digital values comprises less than 500 Mega-values per second.

9. The method of claim 7 wherein each of the digital values in the final stream has at least 12 bits of resolution.

10. The method of claim 1 wherein the plurality of streams of digital values comprises at least 32 streams of digital values.

11. An automatic test system, comprising:
    a) a timing generator providing a first clock signal;
    b) at least one digital pin circuit coupled to the timing generator and generating or measuring a digital test signal at times referenced to the first clock signal; and
    c) at least one analog instrument coupled to the timing generator, the analog instrument generating or measuring an analog signal at times referenced to a periodic signal of programmable frequency synchronized to the first clock signal, the analog instrument comprising apparatus for generating the periodic signal, the apparatus comprising:

i) a circuit for generating from the first clock signal a second clock signal having a frequency that is a multiple of the first clock signal;

ii) a plurality of circuits, each having a control input, a clock input clocked by the first clock signal and an output, each circuit producing a value at its output representing a sample of an analog signal at a time determined by its control input;

iii) a selector circuit having a plurality of switchable inputs, each of the switchable inputs connected to the output of one of the plurality of circuits, and a control input, clocked by the second clock signal, wherein the selector circuit connects a different one of its switchable inputs to its output when its control input is clocked by the second clock signal;

iv) a digital to analog converter having a digital input coupled to the output of the selector circuit and an analog output representative of the periodic signal.

12. The automatic test system of claim 11, wherein the second clock signal has a frequency that is at least 32 times the frequency of the first clock signal.

13. The automatic test system of claim 11, wherein the plurality of circuits are CMOS circuits.

14. The automatic test system of claim 11, wherein the plurality of circuits are implemented in a single gate array chip.

15. The automatic test system of claim 11, additionally comprising a filter connected to the output of the digital to analog converter.

16. The automatic test system of claim 15, additionally comprising a comparator connected to the output of the filter.

17. The automatic test system of claim 16, wherein the analog instrument comprises an arbitrary waveform generator, the arbitrary waveform generator having a clock input derived from an output of the comparator.

18. The automatic test system of claim 17, wherein the second clock signal has a frequency that is at least 4 GHz.

19. The automatic test system of claim 11, wherein each of the plurality of circuits comprises a plurality of accumulators, each accumulator clocked by the first clock signal.

20. The automatic test system of claim 19, wherein each accumulator comprises an input coupled to a programmable register.

21. The automatic test system of claim 11, wherein each of the plurality of circuits comprises a memory.

22. The automatic test system of claim 21, wherein each of the memories in the plurality of circuits stores samples of a sine wave.

23. An automatic test system, comprising:

a) a timing circuit providing a first clock signal;

b) at least one digital test circuit coupled to the timing circuit and generating or measuring a digital test signal at times referenced to the first clock signal; and c) at least one analog instrument coupled to the timing circuit, the analog instrument generating or measuring an analog signal at times referenced to a periodic signal of programmable frequency synchronized to the first clock signal, the analog instrument comprising apparatus for generating the periodic signal, the apparatus comprising:

i) a frequency multiplier adapted and arranged to receive the first clock signal as an input and to generate as an output a second clock signal, the second clock signal having a frequency that is a multiple of the first clock signal;

ii) a plurality of accumulators, each having a storage location and circuitry to add a predetermined amount to the value in the storage location during each cycle of the first clock signal;

iii) a plurality of memories having an address input and a data output, the address input of each of the memories connected to one of the accumulators, each of the memories producing an output in response to the value of the address input for each cycle of the first clock;

iv) a selector circuit having a plurality of switchable inputs, each of the switchable inputs connected to a data output of one of the plurality of memories, and a control input, clocked by the second clock signal, wherein the selector circuit connects a different one of its switchable inputs to its output when its control input is clocked by the second clock signal; and v) a digital to analog converter having a digital input coupled to the output of the selector circuit and an analog output representative of the periodic signal.

24. The automatic test system of claim 23, additionally comprising a filter connected to the output of the digital to analog converter.

25. The automatic test system of claim 24, additionally comprising a comparator coupled to the output of the digital to analogs converter, the comparator having an output for a digital clock, wherein the digital clock is the periodic signal.

26. The automatic test system of claim 25, wherein the analog instrument is an arbitrary waveform generator.

* * * * *